July 17, 1923.

H. J. KAIM

REVERSING MECHANISM FOR LATHES

Filed Oct. 16, 1920

1,461,776

Inventor,
Henry J. Kaim
by H. S. Johnson
his Attorney.

Patented July 17, 1923.

1,461,776

UNITED STATES PATENT OFFICE.

HENRY J. KAIM, OF ST. PAUL, MINNESOTA.

REVERSING MECHANISM FOR LATHES.

Application filed October 16, 1920. Serial No. 417,293.

*To all whom it may concern:*

Be it known that I, HENRY J. KAIM, a citizen of the United States, residing at St. Paul, in the county of Ramsey and State of Minnesota, have invented certain new and useful Improvements in Reversing Mechanism for Lathes, of which the following is a specification.

This invention relates to reversing mechanism for lathes, and has for one of its objects to provide means, adapted to be mounted in the headstock of a lathe whereby the direction of rotation of the spindle may be quickly and conveniently reversed, the device being applied directly to the spindle. Ordinarily lathes are provided with a pair of belts one of which is crossed, and with shifting mechanism, including a shifting lever depending from the counter shaft which the operator is required to operate to reverse the spindle. In such equipment, the inertia of the counter shaft and the tight pulleys thereon must be overcome with each reversing movement, causing the belts to slip on the face of the pulley and not infrequently run off of it.

Another object of the invention is to dispense with the ordinary tedious and dangerous process of belt shifting necessary for reversing the spindle by substituting constantly running pulleys revolving in opposite directions, mounted directly in the headstock.

In the drawings:

Figure 1 designates a vertical cross section taken on a central line longitudinally of the headstock, the headstock being shown partly broken away.

Figure 1:
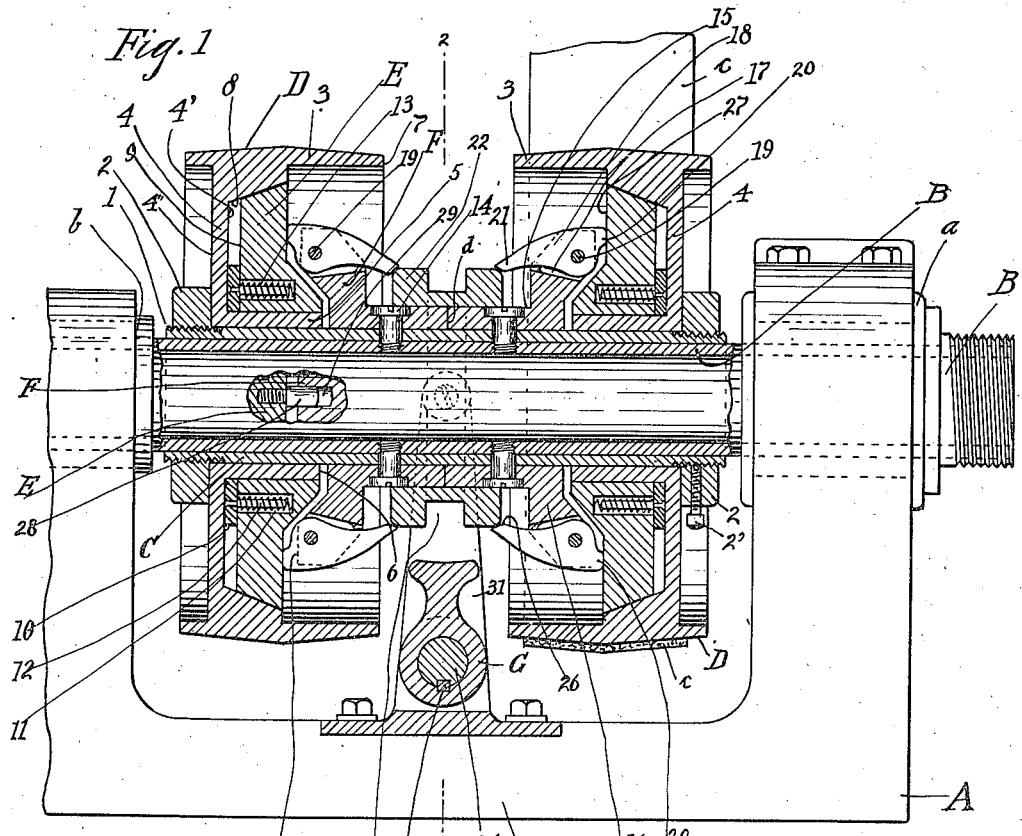
Figure 2:
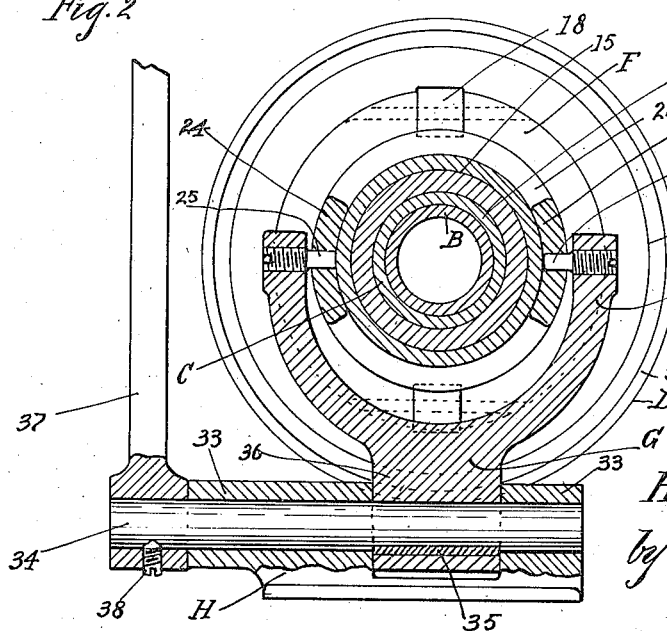
Figure 2 is a sectional view on line 2—2 of Figure 1.
Figure 3:
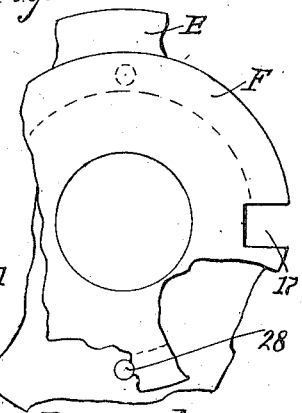
Figure 3 is a fragmentary front view of one side of one of the male clutch members.

A designates a headstock of a lathe, B the hollow spindle rotatably mounted therein in the usual way, and C a tubular bushing surrounding the spindle and extending from the journal box $a$ to the journal box $b$ of the headstock. The ends of the bushing are formed with screw-threads 1, which have threaded engagement with adjusting rings 2, one for each end. The rings are held positioned against rotary movement by set screws 2'. Rotatably and symmetrically mounted about a median line on the bushing C, are a pair of spaced belt pulleys D, the one a duplicate of the other. Each pulley comprises a rim 3, the face thereof being suitably crowned to operatively retain the driving belt $c$. In use one of the belts $c$ is twisted so as to cause the pulleys to revolve in opposite directions. Each pulley further comprises a web 4 having flat opposite faces 4' and 4" and extending inwardly from the face 4', a hub 5, the end 6 of said hub being spaced a distance from the inner edge 7 of the pulley. The pulley is formed with a conic clutch seat 8 flaring outwardly from the face 4' of the web 4, which constitute the female member of an ordinary friction cone clutch. Rotatably fitting around the hub 5, which latter is of uniform diameter, is the male clutch member E, adapted to frictionally fit against the conic clutch seat 8 of the pulley. The clutch member E is formed with a flat outer face 9, normally spaced from the inner face 4' of the web 4, said space being occupied by a ring 10 which slidingly fits flatly over the face 4' of the web. In the face 9 of the clutch member E are deep circular recesses 11, the longitudinal axis thereof parallel with that of the spindle B. The recesses, of which two are shown, are adapted to loosely receive the pin 12 projecting from the inner face of the ring 10, and the coil spring 13 surrounding said pin, said spring constantly tending to separate the ring and the clutch member. Carried by the spindle and revolving therewith, and preferably secured thereto by means of screws 14 projected through the bushing C and screw-threaded in the spindle B, is the housing F. The housing is spool-like in shape and consists of a central bearing portion 15 of uniform diameter located midway between the pulleys D and designed of a length so as to overlap the opposite edges 7 of the pulleys; and flange-like circular end portions 16, each having a pair of oppositely disposed notches 17, in its periphery. In each of said notches is pivotally mounted a fulcrumed lever 18, the pivot pin 19 thereof axially in a plane at right angles to the axis of the spindle B, so that said lever will swing in the plane of said axis. The pivot pin 19 constitutes a fulcrum for the lever, the short arm of said lever being formed with a cam end 20 above its fulcrum 19, and a long arm portion 21, on the opposite side of the fulcrum. Rotatable on the bearing portion 15 of the housing is the grooved shift ring 22, having an annular groove 23, wherein slidingly fit two oppositely disposed segmental shoes 24, each shoe having a radially disposed bore wherein is journaled a pin 25, said pins being radially oppositely disposed with respect to the spindle B. The ring 22 is of a size and suitably rounded so as to engage the curved cam faces 26 of the respective levers 18 to move the tail portions 21 upwardly. The cam end 20 of the lever engages with the inner face 27 of the clutch member E, so that when the ring 22 is slid longitudinally on the bearing 15 in one direction, the tail 21 of the lever will be raised thereby forcing the clutch member E against the seat 8 of the pulley. Extending at right angles from the face 27 of the clutch member are the pins 28, said pins slidingly fitting into the openings 29 in the face 30 of the housing F.

Thus when one of the clutch members E is in frictional engagement with its pulley, the pins 28 being slidably connected with the housing F, will thereby operatively connect the spindle with the pulley and thus cause it to be driven. Obviously when the ring 22 is slid in opposite direction responsive to the movement of the lever 37 in that direction, the opposite pulley will be likewise engaged and will cause the spindle to be revolved in the opposite direction.

The pins 25 are threadedly mounted in the respective opposite arms 31 of the yoke G. Preferably inset in the base 32 of the head stock is the support H, comprising longitudinally spaced journal hubs 33 rotatably supporting the shaft 34, said shaft being disposed below and at right angles to the spindle B. Closely fitting the space between the journal hubs and secured by means of the key 35 to the shaft 34, is the shank 36 of the yoke G. An upstanding lever 37 secured by means of the set screw 38 on the end of the shaft 34, serves as a means whereby the yoke G may be rocked, whereby the ring 22 will be slid back and forth to operate either pulley as desired. As the conic faces of the clutch members become worn with use, the pulley may be moved longitudinally on the bushing by means of the adjustment rings 2.

By mounting the movable clutch member on the pulley hub and inserting the springs in the manner shown, I am enabled to apply the invention between the journal boxes of many standard makes of lathe originally designed with the well known cone pulleys.

As shown in the drawings the housing is split at $d$ which enables me to insert the grooved shift ring 22.

It will be noted that the device may be removed as a unit from the spindle by simply removing the screws 14 and backing out the pins 25, so that the device may be shipped in assembled state it only being necessary to tap the spindle of a standard lathe for the screws 14.

I claim:

1. The combination with the headstock of a lathe and the spindle journaled at its ends therein, two spaced pulleys each formed with a hub revolvably supported on the spindle between its journals the adjacent sides of said pulleys being formed with clutch seats, horizontally and longitudinally disposed fulcrumed levers for each pulley supported on the spindle and moving bodily therewith, the short lever arms thereof directed toward their respective pulleys, hand operable means including a shift ring on the spindle adapted, when it is shifted in opposite directions, to engage with the respective fulcrumed levers for said pulleys to move said short lever arms toward their respective pulleys, a clutch member housed in each pulley and revoluble on the hub thereof and spring means interposed between each clutch member and its pulley for holding the former under stress against its respective fulcrumed levers.

2. The combination with the headstock of a lathe and the spindle journaled at its ends therein, a bushing surrounding the spindle and secured thereto, mechanism including an oscillatory operating lever, and positioned midway of the length of said bushing, a part of said mechanism rotating with the bushing, said rotating part including oppositely disposed levers, pulleys having clutch seats, one pulley adjacent each end of said mechanism revolubly mounted on said bushing, a clutch member for each pulley revolving with said rotating part of said mechanism and slidable toward its pulley to engage with the clutch seat thereof when slid, a ring interposed between each clutch member and its pulley, means carried on the ring for normally yieldingly holding said clutch member away from its clutch seat and against its respective levers, and an adjustment member for each pulley threaded on the end of said bushing and engaging with the pulley for the purpose set forth.

3. A reversing mechanism for lathes comprising a spindle rotatably mounted, a pair of pulleys journaled on the spindle and having opposed dished faces, a clutch member journaled on the hub of each pulley and adapted to be slid thereon to nest in the dished portion of its pulley, a spool-like housing secured on the spindle between the clutch members, a plurality of clamping levers pivoted on the end flanges of the housing for camming against the clutch members to move them to operative position, means for loosely connecting the clutch members to the housing, and a shift ring slidable on the housing for selectively engaging the respective clamping levers to render them operative.

In testimony whereof I affix my signature.

HENRY J. KAIM.